United States Patent
Kojima et al.

(10) Patent No.: US 7,063,180 B2
(45) Date of Patent: Jun. 20, 2006

(54) STEERING TRANSMISSION DEVICE AND STEERING APPARATUS

(75) Inventors: Takao Kojima, Hitachi (JP); Masahiko Amano, Hitachiota (JP); Masatoshi Hoshino, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/929,502

(22) Filed: Aug. 31, 2004

(65) Prior Publication Data
US 2005/0173184 A1    Aug. 11, 2005

(30) Foreign Application Priority Data
Feb. 9, 2004    (JP) .............................. 2004-032375

(51) Int. Cl.
*B62D 5/18*    (2006.01)
(52) U.S. Cl. ...................... 180/444; 74/388 PS; 475/7; 475/9; 475/230
(58) Field of Classification Search ................ 180/443, 180/444; 74/388 PS; 475/4, 7, 9, 230
See application file for complete search history.

(56) References Cited

U.S. PATENT DOCUMENTS

| | | |
|---|---|---|
| 3,744,587 A | 7/1973 | Schimkat et al. |
| 5,226,498 A * | 7/1993 | Gutkowski et al. ......... 180/444 |
| 5,511,629 A | 4/1996 | Vogel |
| 5,719,459 A | 2/1998 | Hasegawa |
| 5,927,428 A * | 7/1999 | Nagao et al. ............... 180/444 |
| 5,957,803 A | 9/1999 | Fini, Jr. |
| 6,026,925 A * | 2/2000 | Nagao et al. ............... 180/444 |

FOREIGN PATENT DOCUMENTS

| | | |
|---|---|---|
| FR | 2 606 480 | 5/1988 |
| GB | 538413 | 8/1941 |
| JP | 2000-302050 | 10/2000 |

\* cited by examiner

*Primary Examiner*—Lesley D. Morris
*Assistant Examiner*—Matthew Luby
(74) *Attorney, Agent, or Firm*—Crowell & Moring LLP

(57) ABSTRACT

In a vehicle steering transmission device, a first gear is rotatable on a rotational axis to rotate in accordance with a vehicle steering operation, a second gear is rotatable on the rotational axis and connectable to a vehicle wheel so that an orientation of the vehicle wheel is changed, an intermediate gear engages with the first and second gears, a support member is rotatable on the rotational axis while supporting the intermediate gear in such a manner that the intermediate gear is rotatable on another rotational axis which another rotational axis intersects the rotational axis and extends perpendicularly to the rotational axis, and a driving device drives the support member to rotate on the rotational axis so that a differential rotational motion is generated between the first and second gears.

7 Claims, 3 Drawing Sheets

STEERING TRANSMISSION DEVICE AND STEERING APPARATUS

BACKGROUND OF THE INVENTION

The present invention relates to a vehicle steering transmission device for transmitting a vehicle steering operation by a vehicle driver to a vehicle wheel, and a vehicle steering apparatus for steering the vehicle in accordance with the vehicle steering operation.

In a prior art vehicle steering transmission device as disclosed by JP-A-2000-302050, a vehicle steering operation by a vehicle driver is transmitted to a vehicle wheel through an planetary gear train.

BRIEF SUMMARY OF THE INVENTION

An object of the present invention is to provide a vehicle steering transmission device and a vehicle steering apparatus including the vehicle steering transmission device, in which a radial size of the vehicle steering transmission device can be decreased in comparison with the prior art vehicle steering transmission devices.

According to the invention, a vehicle steering transmission device for transmitting a vehicle steering operation by a vehicle driver through for example, a steering wheel or a joy stick to a vehicle wheel rotatable on a vehicle wheel axis so that an orientation of the vehicle wheel axis or the vehicle wheel is changed in accordance with the vehicle steering operation, includes, a first gear being rotatable on a rotational axis to rotate in accordance with the vehicle steering operation, and a second gear being rotatable on the rotational axis and connectable to the vehicle wheel so that an orientation of the vehicle wheel is changed. An intermediate gear engages with the first and second gears to transmit a rotation between the first gear and the second gear (that is, from the first gear to the second gear, or from the second gear to the first gear) through the intermediate gear. A support member is rotatable about a first rotational axis while supporting the intermediate gear in such a manner that the intermediate gear is rotatable on another rotational axis that intersects the first rotational axis and extends perpendicularly to the first rotational axis to generate a differential rotational motion between the first and second gears. A driving device drives the support member to rotate on the rotational axis so that the differential rotational motion is generated between the first and second gears in accordance with an orbital motion of the intermediate gear around the first rotational axis as well as a rotation of the intermediate gear on the other rotational axis.

Since support member supports the intermediate gear in such a manner that the intermediate gear is rotatable on the other rotational axis which another rotational axis intersects the first rotational axis and extends perpendicularly to the first rotational axis, the intermediate gear can face each of the first and second gears in a direction parallel to the rotational axis. Thus, the intermediate gear does not need to extend to an radially outside position with respect to the first and second gears. Therefore, a radial size of the vehicle steering transmission device can be decreased in comparison with prior art vehicle steering transmission device including respective planetary gear trains.

If the support member includes at least a worm wheel segment (at least a circumferential part or segment of a worm wheel or the worm wheel), and the driving device includes a worm engaging with the worm wheel segment so that the support member is rotationally driven on the rotational axis by the driving device through the engagement between the worm wheel segment and the worm, a rotational position of the support member can be kept stationary without a braking mechanism added to the vehicle steering transmission device. The driving device may include a motor to generate a torque for rotating the support member on the rotational axis.

If a radius of a pitch circle on which the first gear and the intermediate gear engage with each other is equal to a radius of a pitch circle on which the second gear and the intermediate gear engage with each other, a transmission gear ratio through the vehicle steering transmission device is kept at 1:1 when the support member is rotationally stationary, so that conventional steering mechanism other than the planetary gear trains are usable with the vehicle steering transmission device of the invention.

It is preferable that the first gear, second gear and intermediate gear are bevel gears.

It is also preferable for decreasing the radial size of the vehicle steering transmission device that gear teeth of the first gear are opposite or face gear teeth of the second gear through the intermediate gear in a direction parallel to the rotational axis.

In a vehicle steering apparatus for steering a vehicle in accordance with a vehicle steering operation by a vehicle driver, in which a vehicle wheel is rotatable on a wheel axis, the steering transmission device and a connecting member are arranged between the steering transmission device and the vehicle wheel so that the vehicle steering operation is transmitted through the steering transmission device and the connecting member to the vehicle wheel to change an orientation of the vehicle wheel.

Other objects, features and advantages of the invention will become apparent from the following description of the embodiments of the invention taken in conjunction with the accompanying drawings.

DETAILED DESCRIPTION OF THE INVENTION

Figure 1:
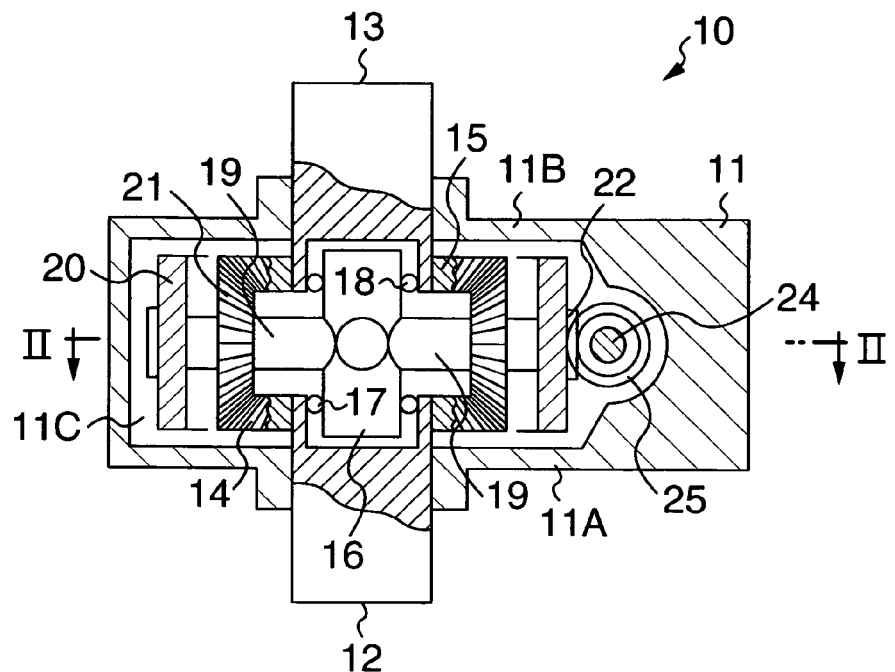
FIG. 1 is a cross sectional view showing an embodiment of a transmission device of the invention.
Figure 2:
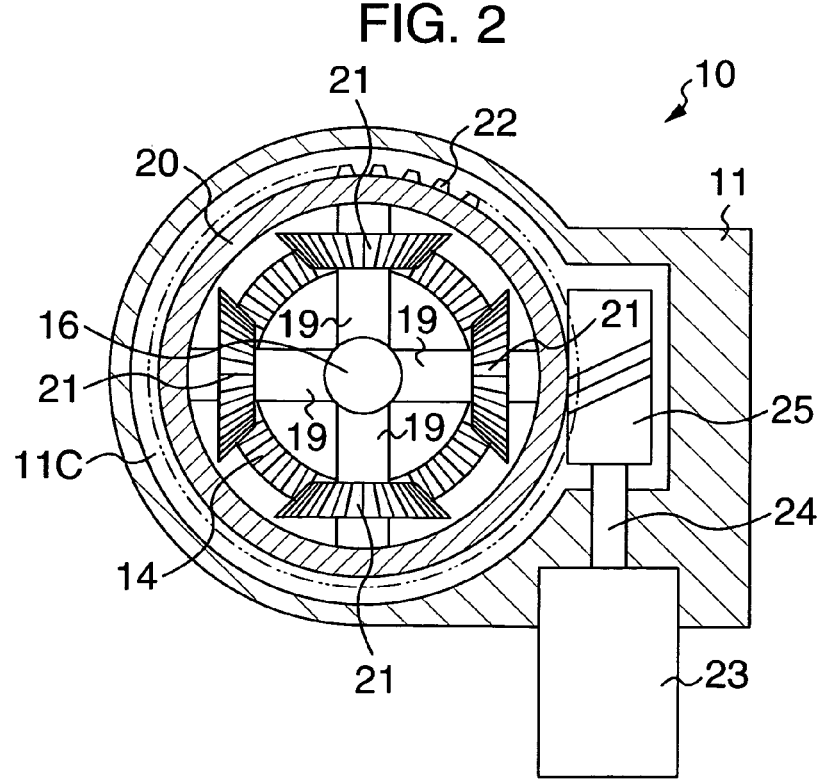
FIG. 2 is a cross sectional view taken along a line II—II in FIG. 1.
Figure 3:
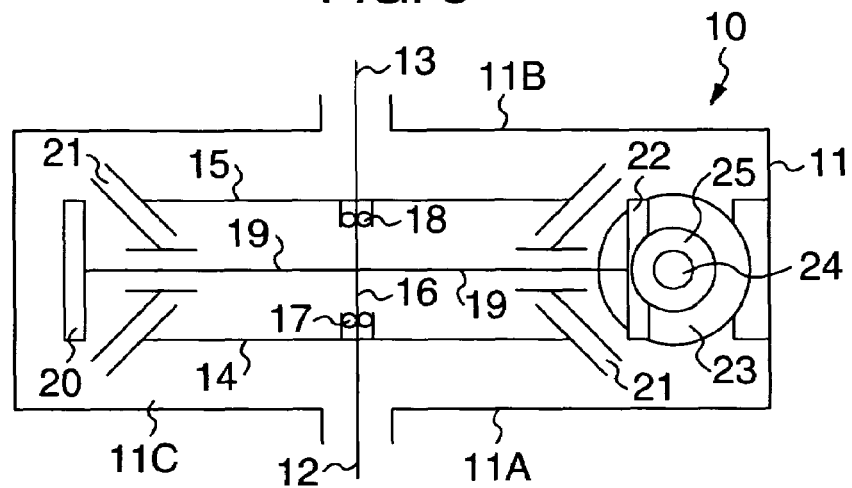
FIG. 3 is a perspective view of the transmission device of FIG. 1.

An embodiment of a driving force transmission device of the invention is described with reference to FIGS. 1–3.

A driving force transmission device 10 includes a frame 11 mounted fixedly. The frame 11 supports an input rotary shaft 12 in a rotatable manner at an end portion 11A, and an output rotary shaft 13 in a rotatable manner at another end portion 11B. The input rotary shaft 12 and output rotary shaft 13 are arranged on a common axis.

In a gear box 11C defined by the frame 11, an input gear 14 fixedly mounted on an end of the input rotary shaft 12 and an output gear 15 fixedly mounted on the output rotary shaft 13 are arranged on the common axis and opposite to each other. The input gear 14 and output gear 15 are bevel gears having the same diameter and shape.

A rotary support member (carrier) 16 is arranged between the input rotary shaft 12 and output rotary shaft 13. The rotary support member 16 is arranged on the common axis of the input rotary shaft 12 and output rotary shaft 13, and supported at both ends thereof by respective ball-bearings 17 and 18 on the input rotary shaft 12 and output rotary shaft 13 in a rotatable manner on the common axis of the input gear 14 and output gear 15.

The rotary support member 16 includes monolithically four support shafts 19 extending at an intermediate area between the input rotary shaft 12 and output rotary shaft 13 in an axial direction radially from and perpendicularly to the rotary axis of the input rotary shaft 12 and output rotary shaft 13.

The four support shafts 19 have respective lengths equal to each other, cross each other as seen on an imaginary plane perpendicular to the axial direction of the input rotary shaft 12 and output rotary shaft 13 and are connected fixedly at outer ends thereof to a ring member 20 coaxial with the rotary support member 16, in other words, coaxial with the input rotary shaft 12 and output rotary shaft 13. That is, the ring member 20 is supported through the four support shafts 19 on the rotary support member 16 coaxially.

Intermediate gears 21 of bevel gears are supported by the four support shafts 19 respectively to rotate on the four support shafts 19 and engage with both the input gear 14 and output gear 15. In this case, a radius of a pitch circle on which the input gear 14 and each of the intermediate gear 21 engage with each other is equal to a radius of a pitch circle on which the output gear 15 and each of the intermediate gears 21 engage with each other.

That is, the intermediate gears 21 form respective bevel gear engagements with each of the input gear 14 and output gear 15, and the ring member 20 has its rotational axis coaxial with the common axis of the input rotary shaft 12 and output rotary shaft 13 and the rotary support member 16 to be rotatable with respect to each of the input rotary shaft 12 and output rotary shaft 13. The intermediate gears 21 rotate (orbit) along a circumference of the input gear 14 and output gear 15 according to a rotation of the ring member 20 while engaging with the input gear 14 and output gear 15.

In this structure, when the ring member 20 is fixed to be prevented from rotating, a rotation of the input rotary shaft 12 is transmitted to the input gear 14 and intermediate gears 21 so that the intermediate gears 21 rotate without orbital motion, because the ring member 20 is fixed.

Therefore, since the radius of the pitch circle on which the input gear 14 and each of the intermediate gears 21 engage with each other is equal to the radius of the pitch circle on which the output gear 15 and each of the intermediate gears 21 engage with each other, the input gear 14 and output gear 15 have a common rotational degree, that is a rotational amount of the input shaft 12 and a rotational amount of the output shaft 13 are equal to each other, that is, a gear ratio (transmission ratio) is substantially 1:1.

On the other hand, if the ring member 20 is not fixed to be freely rotatable, the rotation of the input shaft 12 transmitted to the intermediate gears 21 generates the rotation of the ring member 20 as well as the intermediate gears 21 to prevent a rotational force from being transmitted to the output shaft 13, because the ring member 20 is not fixed.

Therefore, by adjusting a rotating amount and rotating direction of the ring member 20, a rotation transmitting amount from the input rotary shaft 12 to the output rotary shaft 13 is freely adjustable, that is, a relationship between an operating amount at an input side and an operated amount at an output side is freely adjustable. In other words, the transmission ratio can be continuously increased and decreased.

An outer peripheral portion of the ring member 20 includes a worm wheel (spur gear) (including at least a worm wheel segment as a circumferential part of the worm wheel) 22 engaging with a worm gear 25 fixed to an output rotary shaft 24 of an electric motor 23 mounted on the frame 11.

Therefore, in accordance with control of a rotating direction and rotating amount of the electric motor 23, the rotating direction and rotating amount (rotating angle) of the ring member 20 is adjusted to increase and decrease continuously the transmission ratio, so that in accordance with the control on the rotating direction and rotating amount of the electric motor 23, the relationship between the operating amount at the input side and the operated amount at the output side is freely adjustable to enable an input and output gear ratio (transmission ratio) to be freely and continuously adjustable.

Further, by preventing the electric motor from rotating, the ring member 20 is prevented from rotating by an braking effect on an engagement between the worm gear 24 and worm wheel 22, so that the input and output gear ratio becomes necessarily about 1:1.

In the driving force transmission device as described above, since the input gear 14 and output gear 15 are opposed to each other on the common axis, and the shafts 19 for the intermediate gears 21 extend perpendicularly to the rotary shafts 12 and 13 for input gear 14 and output gear 15, the device can be made compact in the radial direction of the input rotary shaft 12 and output rotary shaft 13.

Figure 4:
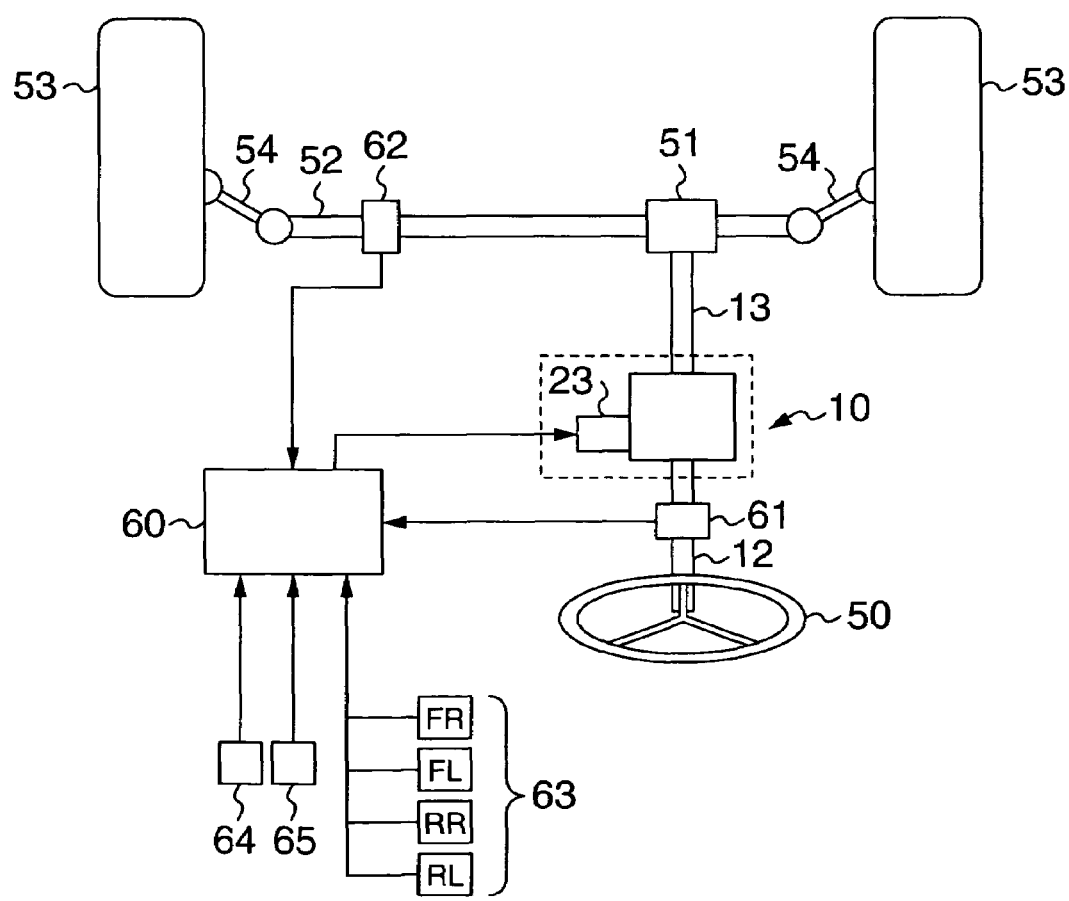
FIG. 4 is a view showing an embodiment of a vehicle steering apparatus of the invention.

An embodiment in which the driving force transmission device 10 of the invention is applied to a steering apparatus of an automobile is explained with reference to FIG. 4.

The input rotary shaft 12 of the driving force transmission device 10 is connected to a steering wheel 50. The output rotary shaft 13 of the driving force transmission device 10 is connected to a tie rod 52 through a gear box 51 such as a rack-and-pinion mechanism or a ball screw mechanism. Opposite ends of the tie rod 52 are connected to knuckle arms 54 of left and right vehicle wheels 53 respectively.

Incidentally, the gear box 51 can include power-steering performance.

The rotation of the output rotary shaft 13 is converted by the gear box 51 to an axial displacement (movement) of the tie rod 52 so that the vehicle wheels 53 are operated through the knuckle arms 54.

In this structure, the rotation of the steering wheel 50 is transmitted to the vehicle wheels 53 through a steering angle transmission mechanism including the input rotary shaft 12, driving force transmission device 10, output rotary shaft 13, gear box 51, tie rod 52 and knuckle arms 54.

As described above, a force transmitting amount, that is, the transmission ratio of the driving force transmission device 10 is continuously adjustable in accordance with the control of the rotating direction and rotating amount of the electric motor 23, and the input-output transmission ratio becomes about 1:1 when the motor 23 is stopped (in not-driven condition).

The control of the rotating direction and rotating amount of the electric motor 23 as well as the stop thereof is performed in accordance with an instruction from a controller 60.

The controller 60 is of microcomputer type, and receives data regarding an rotating angle of the steering wheel 50 measured by a steering wheel angle sensor 61, a steered angle (an actual orientation angle) of the vehicle wheels 53 by a steering angle sensor 62 and a vehicle speed measured by vehicle wheel speed sensors 63. The controller 60 calculates a target steered angle of the vehicle wheels 53 preferable at each timing from a vehicle moving condition and an estimated vehicle driver's intention on the basis of such data, compares it with an output of the steering angle sensor 62 (the actual orientation angle), and controls the electric motor 23 so that the actual orientation angle of the vehicle wheels 53 is made equal to the target steered angle when they are different from each other.

Figure 5:
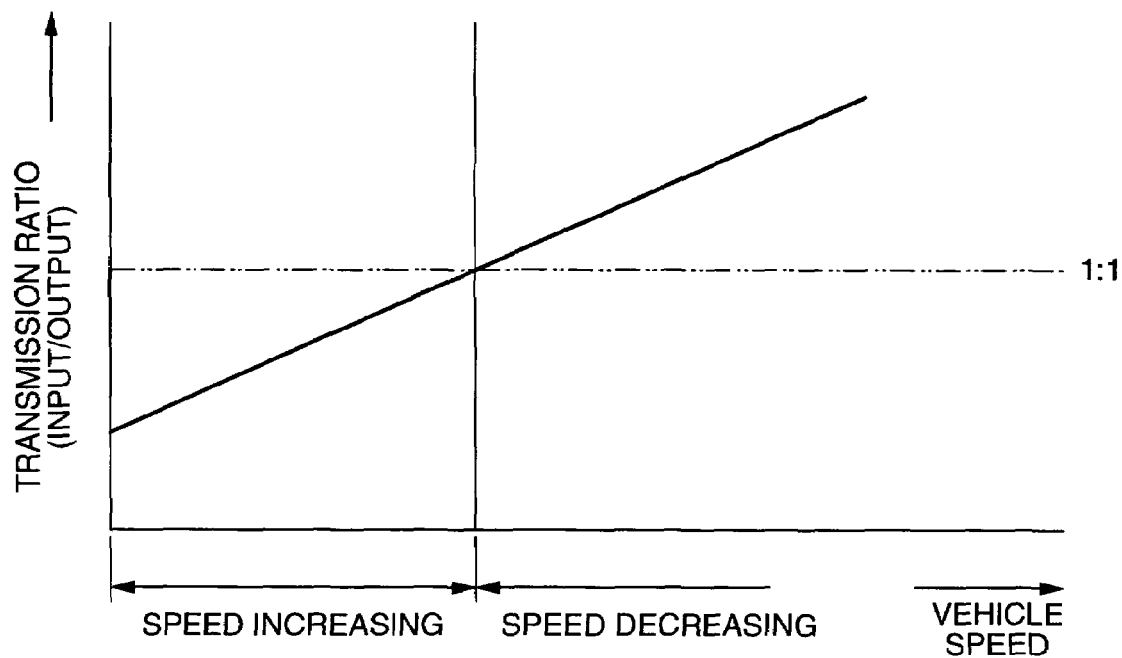
FIG. 5 is a diagram showing a proportional control characteristic of steering gear in accordance with vehicle speed.
Figure 6:
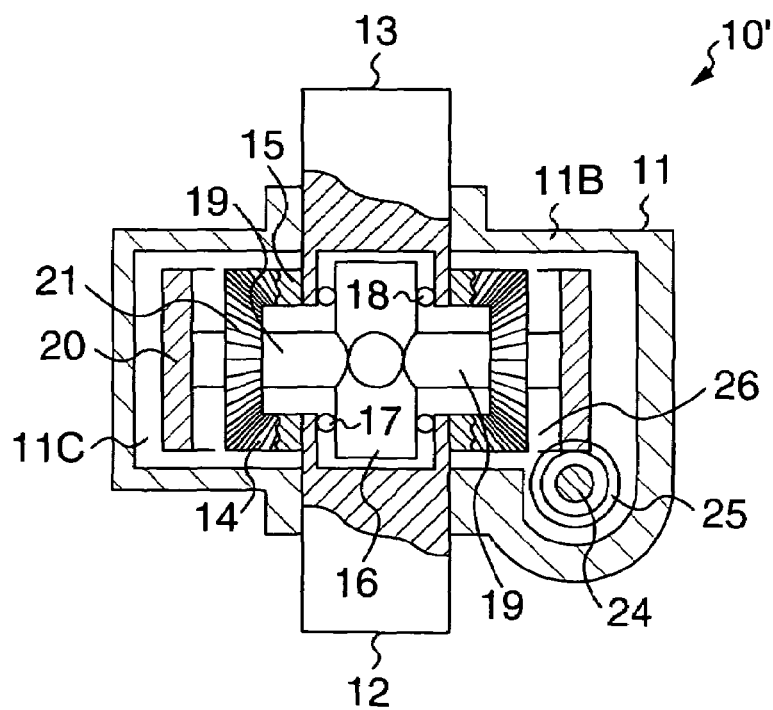
FIG. 6 is a cross sectional view showing another embodiment of the transmission device of the invention.

Further, the controller 60 adjusts the transmission ratio of the driving force transmission device 10 in accordance with the vehicle speed measured by the vehicle wheel speed sensors 63. A variable gear ratios steering control (VGRS control) in accordance with the vehicle speed is brought about basically in such a manner that the steering gear ratio (input/output) increases in accordance with an increase of the vehicle speed as shown in FIG. 5.

Therefore, during a low vehicle speed such as when putting the vehicle into a garage, an increased steering gear ratio is obtained so that a great amount of the actual orientation angle is obtained by a small operating amount of the steering wheel to increase steering responsiveness. On the other hand, during a high vehicle speed such as driving on a highway, a decreased steering gear ratio is obtained so that a small amount of the actual orientation angle is obtained by a great operating amount of the steering wheel to improve a stability for straight driving.

Further, the controller receives data regarding a yaw rate of the vehicle measured by a yaw rate sensor 64 and a transverse acceleration measured by a transverse acceleration sensor (transverse G sensor) 65. By controlling the rotating direction and rotating amount of the electric motor 23 of the driving force transmission device 10 on the basis of such data, a steering operation for obtaining a stabilizer effect to prevent the vehicle from moving transversely when receiving a transverse wind during proceeding in high speed, an automatic counter steering operation for restraining a spin or skid-out during proceeding long a curved coarse, and a control for increasing an reactive force applied to the steering wheel are obtainable.

A steered angle control system including the controller 60 includes a fault diagnosis performance so that when a fault is detected by the controller 60, the controller prevents the electric motor from being driven, makes the transmission ratio of the driving force transmission device 10 to be 1:1, and reports the fault to the vehicle driver with an alarm light or sound (not shown).

For preventing the electric motor from being driven, an electric source (electric current) is instantaneously interrupted when the fault occurs in the electric motor 23, and the electric current is decreased gradually during a predetermined time period (short time) when the fault does not occur in the electric motor 23. In the latter case, it is prevented that the vehicle driver feels uncomfortable or a stability of the vehicle is deteriorated momentarily, on switching between driving condition and not-driving condition in response to the instantaneous interruption of the electric current.

As described above, the steering apparatus using the driving force transmission device 10 of the invention has unique effects of that the adjusting control of the steering gear ratio is obtainable as a main goal, and the transmission ratio (input output gear ratio) of the driving force transmission device 10 is made to be about 1:1 as a fail-safe function by preventing the electric motor 23 from rotating. Therefore, the operated rotational amount of the steering wheel 50 is made equal to the rotating amount of the output rotary shaft 13 to enable the automobile to be driven similarly to the conventional automobile even when the fault occurs in the steered angle control system.

Further, since the input output gear ratio of the driving force transmission device 10 is made to be about 1:1 when the electric motor 23 is prevented from rotating, the steering gear mechanism such as the rack and pinion mechanism or the ball-screw mechanism used in the conventional vehicle does not need to be changed for being mounted on the steering apparatus.

Further, when the fault or abnormality does not occurs, the gear ratio of the driving force transmission device 10 may be about 1:1 to satisfy the moving condition of the vehicle, so that the electric power is not needed to obtain the input-output gear ratio of 1:1 and to enable an electric power saving.

Incidentally, the driving force transmission device 10 is not limited to the above described embodiments, and may have a worm wheel 26 engaging with the worm gear 24 at an annular axial end portion of the ring member 20 other than the outer periphery of the ring member 20 so that a radial size of the driving force transmission device 10' is further decreased.

Further, the device may be modified within the scope of the invention by, for example, making a number of the intermediate gears 21 more than four.

Further, the radius of the pitch circle on which the input gear 14 and each of the intermediate gears 21 engage with each other may be different from the radius of the pitch circle on which the output gear 15 and each of the intermediate gears 21 engage with each other, so that the transmission ratio is made to be other than 1:1 when the ring member is fixed.

Further, the input gear 14 and output gear 15 may be face gears, while the intermediate gears 21 may be a spur gear.

Further, the ring member 20 may be fixed by an additional braking means or brake motor other than the braking function by the engagement between the worm gear 25 and the worm wheel 22.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle steering transmission device for transmitting a vehicle steering operation to a vehicle wheel, comprising,
   a first gear being rotatable on a rotational axis to rotate in accordance with the vehicle steering operation,
   a second gear being rotatable on the rotational axis and connectable to the vehicle wheel so that an orientation of the vehicle wheel is changed,
   an intermediate gear engaging with the first and second gears to transmit a rotation between the first gear and the second gear through the intermediate gear,
   a support member being rotatable on the rotational axis while supporting the intermediate gear in such a manner that the intermediate gear is rotatable on another rotational axis which another rotational axis intersects the rotational axis and extends perpendicularly to the rotational axis to generate a differential rotational motion between the first and second gears, and a driving device for driving the support member to rotate on the rotational axis so that the differential rotational motion is generated between the first and second gears.

2. A vehicle steering transmission device according to claim 1, wherein the support member includes at least a worm wheel segment, and the driving device includes a worm engaging with the worm wheel segment so that the support member is rotationally driven on the rotational axis by the driving device through the engagement between the worm wheel segment and the worm.

3. A vehicle steering transmission device according to claim 1, wherein the driving device includes a motor to generate a torque for rotating the support member on the rotational axis.

4. A vehicle steering transmission device according to claim 1, wherein a radius of a pitch circle on which the first gear and the intermediate gear engage with each other is equal to a radius of a pitch circle on which the second gear and the intermediate gear engage with each other.

5. A vehicle steering transmission device according to claim 1, wherein the first gear, second gear and intermediate gear are bevel gears.

6. A vehicle steering transmission device according to claim 1, wherein gear teeth of the first gear are opposite to gear teeth of the second gear through the intermediate gear in a direction parallel to the rotational axis.

7. A vehicle steering apparatus for steering a vehicle in accordance with a vehicle steering operation, comprising, a vehicle wheel, a steering transmission device including:

a first gear being rotatable on a rotational axis to rotate in accordance with the vehicle steering operation, a second gear being rotatable on the rotational axis, an intermediate gear engaging with the first and second gears to transmit a rotation between the first gear and the second gear through the intermediate gear, a support member being rotatable on the rotational axis while supporting the intermediate gear in such a manner that the intermediate gear is rotatable on another rotational axis which another rotational axis intersects the rotational axis and extends perpendicularly to the rotational axis, and a driving device for driving the support member to rotate on the rotational axis so that a differential rotational motion is generated between the first and second gears, and a connecting member arranged between the second gear and the vehicle wheel so that a motion of the second gear is transmitted through the connecting member to the vehicle wheel to change an orientation of the vehicle wheel.

* * * * *